(12) United States Patent
Hucik et al.

(10) Patent No.: US 9,158,512 B1
(45) Date of Patent: Oct. 13, 2015

(54) SYSTEMS, PROCESSES AND COMPUTER PROGRAM PRODUCTS FOR COMMUNICATING AMONG DIFFERENT PROGRAMMING LANGUAGES THAT ARE HOSTED ON A JAVA VIRTUAL MACHINE (JVM)

(71) Applicant: CA, Inc., Islandia, NY (US)

(72) Inventors: Robert Hucik, Simi Valley, CA (US); Liam Irish, Tampa, FL (US); Beau Croteau, Bay Shore, NY (US)

(73) Assignee: CA, Inc., New York, NY (US)

( * ) Notice: Subject to any disclaimer, the term of this patent is extended or adjusted under 35 U.S.C. 154(b) by 97 days.

(21) Appl. No.: 13/791,793

(22) Filed: Mar. 8, 2013

(51) Int. Cl.
*G06F 9/45* (2006.01)
(52) U.S. Cl.
CPC ........................................ *G06F 8/41* (2013.01)
(58) Field of Classification Search
None
See application file for complete search history.

(56) References Cited

U.S. PATENT DOCUMENTS

| | | | |
|---|---|---|---|
| 6,192,418 B1* | 2/2001 | Hale et al. | 719/312 |
| 6,820,266 B1* | 11/2004 | Minakawa et al. | 719/313 |
| 2004/0172620 A1* | 9/2004 | Perez | 717/118 |
| 2005/0155027 A1* | 7/2005 | Wei | 717/162 |
| 2009/0204953 A1* | 8/2009 | Swingler et al. | 717/136 |
| 2011/0167403 A1* | 7/2011 | French et al. | 717/105 |

OTHER PUBLICATIONS

Dr. Dobb's, "A Long Look at JVM Languages", http://www.drdobbs.com/jvm/a-long-look-at-jvm-languages/240007765, Nov. 19, 2012, accessed Jan. 10, 2013, 3 pages.
"0.1 Being Meta, Programming Programming", http://rubymonk.com/learning/books/2/chapters/32-introduction-to-metaprogramming/lessons/75-being-meta, accessed Jan. 14, 2013, 3 pages.
Technical Pickles, "Using method_missing and respond_to? to create dynamic methods", http://technicalpickles.com/posts/using-method_missing-and-respond_to-to-create-dynamic-methods/, accessed Jan. 14, 2013, 5 pages.
"Metaprogramming in Ruby, 1.2 Calling a method", http://ruby-metaprogramming.rubylearning.com/html/ruby_metaprogramming_2.html, accessed Jan. 14, 2013, 6 pages.

(Continued)

*Primary Examiner* — Lewis A Bullock, Jr.
*Assistant Examiner* — Jacob Dascomb
(74) *Attorney, Agent, or Firm* — Myers Bigel Sibley & Sajovec, P.A.

(57) ABSTRACT

An exchange provides communication among programs that run on a Java Virtual Machine (JVM) and that are written in different programming languages that are hosted on the JVM. The exchange intercepts an external call from a first program that runs on the JVM and is written in a first programming language. The exchange identifies a second program that runs on the JVM and is written in a second programming language, to which the external call from the first program may be directed. The exchange directs the external call to the second program and receives a response to the external call from the second program. The response to the external call that is received from the second program is then forwarded back to the first program. Related systems, processes and computer program products are described.

15 Claims, 5 Drawing Sheets

(56) References Cited

OTHER PUBLICATIONS

Jonathan Bartlett, "The art of metaprogramming, Part 1: Introduction to metaprogramming", Oct. 20, 2005, http://www.ibm.com/developerworks/linux/library/l-metaprog1/index.html, accessed Jan. 14, 2013.

The Real Adam, "Why metaprogram when you can program?", http://therealadam.com/2011/12/09/why-metaprogram-when-you-can-program/, accessed Jan. 14, 2013, 8 pages.

Java virtual machine, http://en.wikipedia.org/w/index.php?oldid=532225723, accessed Jan. 10, 2013.

* cited by examiner

SYSTEMS, PROCESSES AND COMPUTER PROGRAM PRODUCTS FOR COMMUNICATING AMONG DIFFERENT PROGRAMMING LANGUAGES THAT ARE HOSTED ON A JAVA VIRTUAL MACHINE (JVM)

BACKGROUND

Various embodiments described herein relate to computer systems, processes (methods) and computer program products and more particularly to computer systems, processes and program products that embody a Java Virtual Machine (JVM).

Java is a general-purpose, class-based, object-oriented computer programming language that is designed to have as few implementation dependencies as possible. It is intended to let application developers "write once, run anywhere", so that a program that runs on one platform does not need to be recompiled to run on another platform. Java applications are typically compiled to bytecode that can run on any JVM regardless of computer architecture. Java is one of the most popular programming languages currently in use, particularly for client-server Web applications.

A JVM is a virtual machine that can execute Java bytecode. JVMs generally are computer programs which execute certain other programs, namely those containing Java bytecode instructions. JVMs are generally implemented to run on an existing operating system but can also be implemented to run directly on hardware. A JVM provides a runtime environment in which Java bytecode can be executed. A JVM is generally distributed along with a Java class library that implements a Java application programming interface. JVMs are available for many hardware and software platforms.

Although the JVM was primarily aimed at running compiled Java programs, many other programming languages can now run on top of it. For example, the "Python" programming language can run on a JVM as "Jython"; the "Rexx" programming language can run on a JVM as "NetRexx"; and the "Ruby" programming language can run on a JVM as "JRuby". Other programming languages such as "Fantom", and "Scala" may be designed expressly for the JVM. These programming languages may be embodied by Java programs that implement their own programming language specifications on top of the JVM.

BRIEF SUMMARY

Various embodiments described herein can provide a system for communicating among programs that run on a Java Virtual Machine (JVM) and that are written in a plurality of different programming languages that are hosted on the JVM. The system comprises an exchange that runs on the JVM. The exchange intercepts an external call from a first program that runs on the JVM and is written in a first of the plurality of different programming languages. The exchange identifies a second program that runs on the JVM and is written in a second of the plurality of programming languages, to which the external call from the first program may be directed. The exchange directs the external call to the second program and receives a response to the external call from the second program. The response to the external call that is received from the second program is then forwarded back to the first program.

In some embodiments, the external call is intercepted by intercepting an external message from the first program, wherein the external message indicates that a method cannot be processed by the first program. In some embodiments, this external message may be a "method missing" message that is received from the first program.

In some embodiments, for purposes of initializing the exchange, methods that are used by the plurality of different programming languages that are hosted on the JVM are identified. The identifying may take place by registering the plurality of different programming languages that are hosted on the JVM with the exchange. In other embodiments, the exchange itself may determine the methods that are used by the plurality of programming languages.

In some embodiments, the exchange is embodied by metaprogramming that runs on one of the plurality of different programming languages that are hosted on the JVM. Moreover, in other embodiments, prior to directing the external call to the second program, the external call may be formatted for processing by a method of the second program. Moreover, in other embodiments, prior to forwarding the response back to the first program, the response is formatted for use by the first program.

Various embodiments have been described above in connection with a first instance of the exchange. The system may also include a second instance of the exchange that runs on the JVM and that causes the JVM to receive a call from the first instance of the exchange; identify a third program that runs on the JVM and is written in a third of the plurality of programming languages, to which the external call from the first program may be directed; direct the external call to the third program; receive a response to the external call from the third program; and forward the response to the external call that is received from the third program, back to the first instance of the exchange.

The exchange may be provided according to various embodiments described herein in combination with the JVM and a plurality of programming language compilers/interpreters for the plurality of programming languages that are hosted on the JVM.

It will be understood that various embodiments have been described above in connection with systems for communicating among programs that run on a JVM. However, various other embodiments described herein can provide a process (or method) for communicating among programs that run on a JVM and that are written in a plurality of different programming languages that are hosted on the JVM. The process may comprise any of the operations described above. Moreover, analogous computer program products may be provided for communicating among programs that run on a JVM and that are written in a plurality of different programming languages that are hosted on the JVM. These computer program products may comprise a tangible computer readable storage medium comprising computer readable program code embodied in the medium that when executed by at least one processor causes the at least one processor to perform any of the operations that run on the JVM, as described above.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Figure 1:
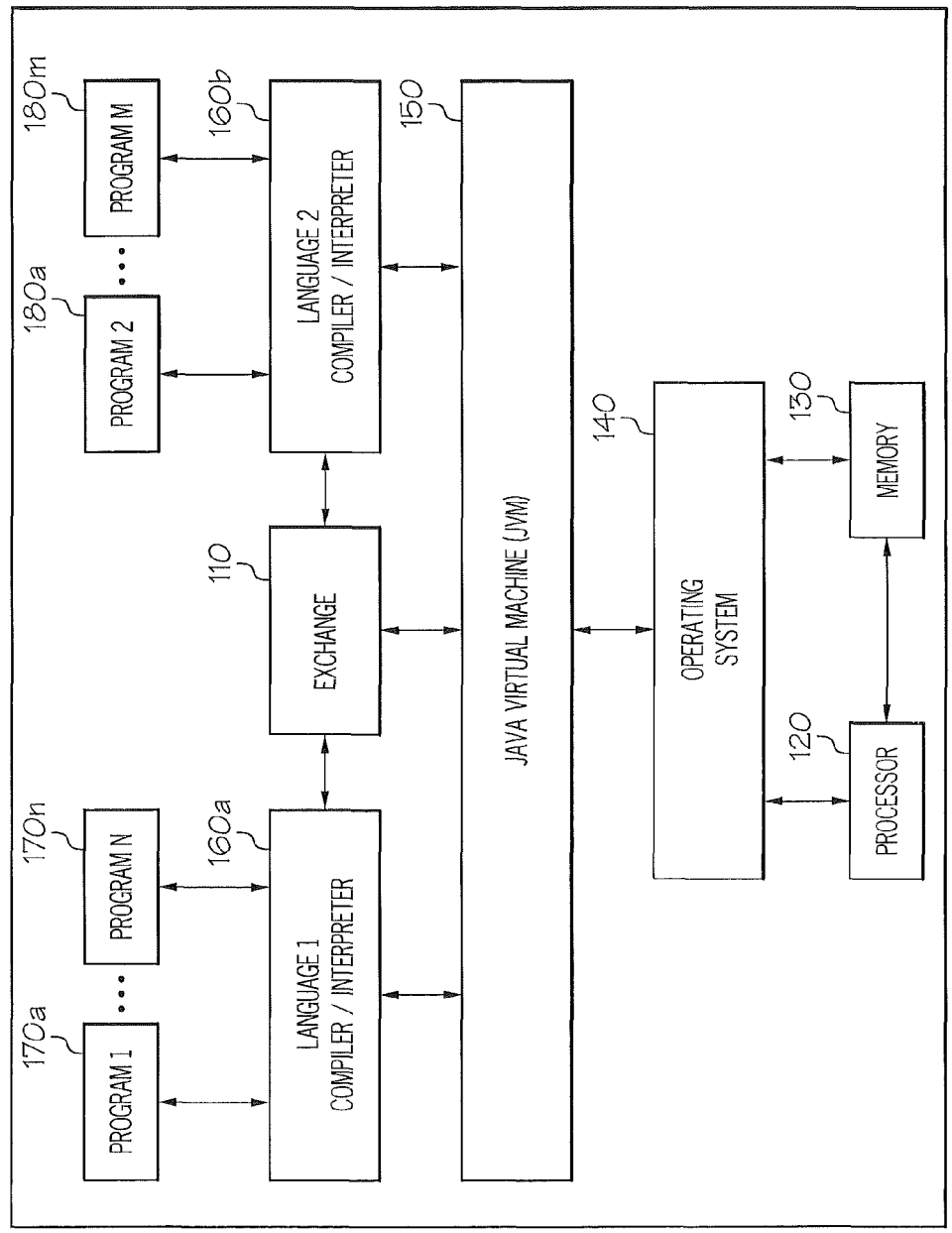
FIG. 1 is a block diagram of systems, processes (methods) and computer program products for communicating among different programming languages that are hosted on a JVM, according to various embodiments described herein.

FIG. 1 is block diagram of systems, processes (methods) and computer program products for communicating among different programming languages that are hosted in a JVM according to various embodiments described herein. Referring now to FIG. 1, these systems, methods (processes) and/or computer program products 100 include a Java Virtual Machine (JVM) 150 that runs on an operating system 140 that itself executes on a processor 120 using instructions in a memory or other tangible computer readable storage medium 130.

The processor 120 may be embodied by one or more enterprise, application personal, pervasive and/or embedded computer systems that are operable to receive, transmit, process and store data using any suitable combination of software, firmware and/or hardware, and that may be standalone or interconnected by any conventional public and/or private, real and/or virtual, wired and/or wireless network including all or a portion of the global communication network known as the Internet. The memory 130 may be a combination of any one or more tangible computer readable media. The operating system 140 may be any conventional operating system. In some embodiments, the processor 120, memory 130 and operating system 140 may be embodied as a personal computer (PC) processor, memory and operating system. In other embodiments, the processor 120, memory 130 and operating system 140 may be embodied as a mobile operating system. The JVM 150 runs on top of the operating system 140 in FIG. 1. However, in other embodiments, the JVM may run directly on the processor 120.

Still referring to FIG. 1, a plurality of programs run on the JVM 150 and are written in a plurality of different programming languages that are hosted on the JVM 150. For example, as illustrated in FIG. 1, a first programming language (Programming language 1) is hosted on the JVM 150 by a Programming language 1 Compiler/Interpreter 160a and a second programming language (Programming language 2) is hosted on the JVM 150 by a Programming language 2 Compiler/Interpreter 160b. More than two programming languages may be hosted by more than two programming language compilers/interpreters, collectively referred to herein as 160. A respective programming language Compiler/Interpreter 160 interfaces with one or more programs that are written in the associated programming language. For example, in FIG. 1, Program 1 170a through Program N 170n are written in Programming language 1, whereas Program 2 180a through Program M 180m are written in Programming language 2. These collections of programs are collectively referred to as programs 170 and 180.

Blocks 120, 130, 140, 150, 160, 170 and 180 may all be part of a Java Runtime Environment (JRE) that need not be described further herein.

Still referring to FIG. 1, an exchange 110 is provided according to various embodiments described herein. The exchange 110 facilitates communication among programs 170, 180 that run on the JVM 150 and that are written in a plurality of different programming languages 160 that are hosted on the JVM 150. As shown in FIG. 1, the exchange 110 itself runs on the JVM 150 and may be embodied by metaprogramming that runs on one of the plurality of different programming languages 160 that are hosted on the JVM. As used herein, the term "metaprogramming" means computer code that operates on computer code rather than on data by inspecting and modifying a program as it runs using constructs exposed by the programming language. The exchange 110 allows calls from one programming language to be dispatched to another programming language within a single JVM. Thus, the exchange 110 may run within a separate environment in the JVM, but can proxy requests within the JVM.

Figure 2:
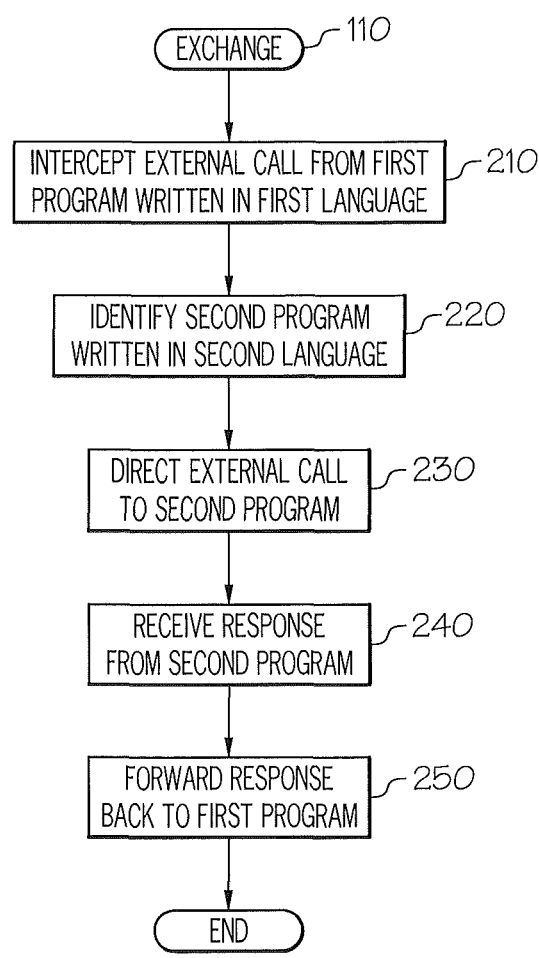
FIG. 2 is a flowchart of operations that may be performed by an exchange of FIG. 1 according to various embodiments described herein.

FIG. 2 is a flowchart of operations that may be performed by an exchange, such as the exchange 110 of FIG. 1, according to various embodiments described herein. Referring to FIG. 2, at Block 210, the exchange intercepts an external call from a first program that runs on the JVM, for example from Program 170a of FIG. 1, that is written in a first of the plurality of different programming languages, such as Programming language 1 160a of FIG. 1. For example, an "error" or "exception" message may be intercepted. At Block 220, a second program that runs on the JVM, such as Program 2 180a of FIG. 1, and that is written in the second of plurality of programming languages, such as Programming language 2 160b of FIG. 1, is identified. The second programming language is identified as one to which the external call from the first program may be directed. For example, the exchange 110 may have previously communicated with the JVM to register methods in the second programming language, as will be described in more detail below.

Still referring to FIG. 2, at Block 230, the external call is then directed, for example by proxying, to the second program, such as Program 2 180a of FIG. 1. The second program then executes the method of the external call using any arguments and/or other parameters that are also provided, and generates a response to the external call. At Block 240, the exchange 110 receives the response from the second program, and at Block 250, the response to the external call that is received from the second program is forwarded back to the first program 170a.

Various techniques may be used to intercept the external call from the first program 170a that is written in the first programming language 160a according to Block 210. For example, an external message from the first program 170a may be intercepted via, for example, the Programming language 1 Compiler/Interpreter 160a. This external message may indicate an "exception", for example a method that cannot be processed by the first program 170a. In some embodiments, where the first programming language 160a is JRuby, a "method_missing" message may be intercepted to indicate that a method cannot be processed by the first program 170a. It will be understood that the "method_missing" message is generally a last ditch effort to find what was being requested because it hasn't been found thus far.

Figure 3:
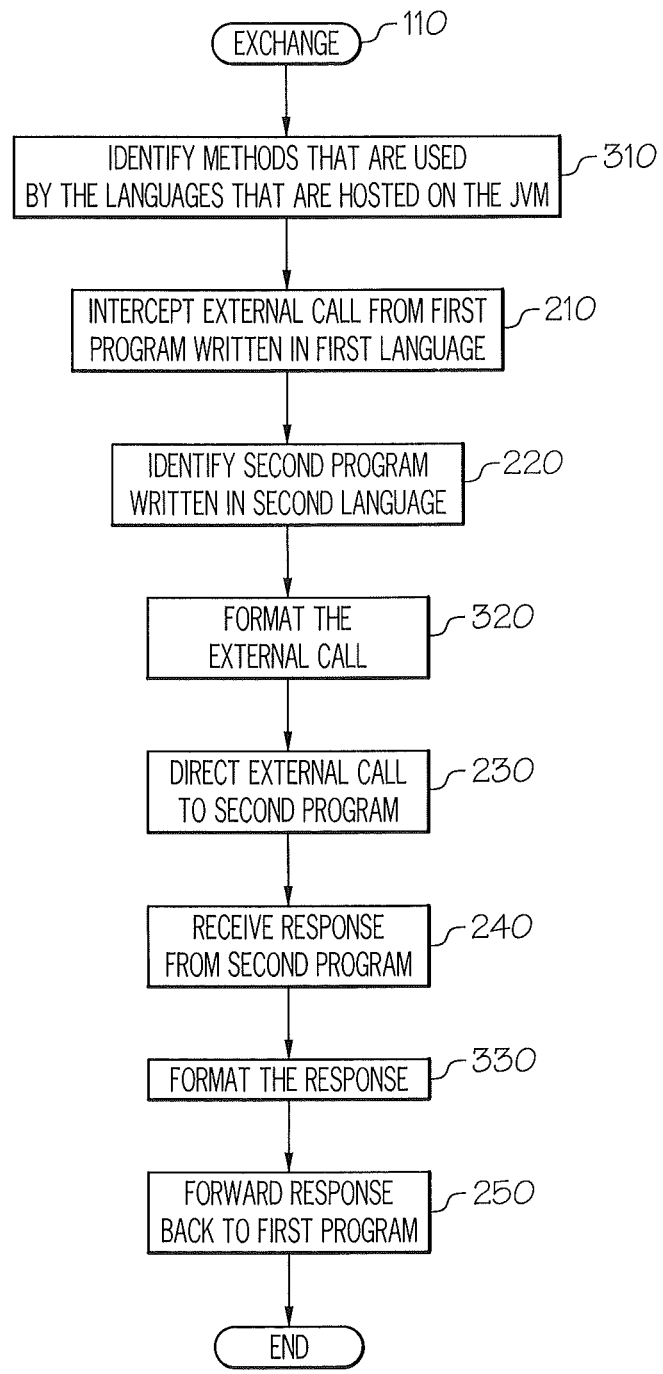
FIG. 3 is a flowchart of additional operations that may be performed by an exchange of FIG. 1 according to various embodiments described herein.

FIG. 3 is a flowchart of additional operations that may be performed by an exchange of FIG. 1, according to various other embodiments described herein. Specifically, in FIG. 3, these embodiments of the exchange may identify methods that are used by the programming languages that are hosted on the JVM at Block 310, may format the external call at Block 320 and/or may format the response at Block 330.

More specifically, at Block 310, prior to intercepting an external call, the exchange 110 may need to acquire knowledge of the methods that are used by the programming languages 160 that are hosted on the JVM 150. This may be accomplished using many techniques. For example, the plurality of different programming languages 160 that are hosted on the JVM 150 may be registered with the exchange 110, for example, by the Programming language 1 Compiler/Interpreter 160a and the Programming language 2 Compiler/Interpreter 160b registering the methods that are available in their respective programming languages and/or that are generated by the respective programs 170, 180 that run on the JVM 150. Accordingly, when a programming language compiler/interpreter and/or a program is installed for running on the JVM, it may register with the exchange 110. Alternatively, the exchange 110 itself may actively obtain these method identifications, for example using an "invoke" function that is part of the JVM and that allows dynamic and direct linkage between calling code and receiving code at runtime. Other techniques may also be used.

Referring to Block 320, prior to directing the external call to the second program at Block 230, the external call may be formatted (or reformatted) so that it may be used by the second program. For example, the external call may identify a Java class, method and arguments or parameters. However, the manner and/or sequence that the first program identifies a Java class, method and/or arguments in the external call may need to be reformatted for use by the second program. This reformatting may be performed at Block 320. Similarly, when the response is received at Block 240, this response may need to be formatted (or reformatted) at Block 330 for use by the first program at Block 250.

Additional discussion of various embodiments described herein will now be provided. Specifically, it may be desirable to allow different programming languages to talk to one another in a JVM. A single JVM can host multiple different programming languages, such as Python, Ruby, etc. In a single JVM, multiple programming languages are hosted in individual environments. However, a JVM was not originally envisioned to host different programming languages. To allow a program running in one programming language to issue a call to a program running in another programming language, it has been necessary to map the call outside the JVM to a proxy that would, for example, map the call to a Uniform Resource Locator (URL) back to another environment in the same JVM. Typically, because of how tightly the implementations were to the Java programming language, a generally accepted practice was to go through standard API mechanisms, i.e. via web service or Remote Procedure Calls (RPC).

In contrast, various embodiments described herein can dynamically dispatch calls from one environment to another within a single JVM. Various embodiments described herein can run within a separate environment in the JVM but can proxy requests within the JVM.

An exchange according to various embodiments described herein can operate using metaprogramming, for example using the "method_missing" object, within the JVM when JRuby is used. Method missing invocations are processed by the exchange. Exceptions go to the method_missing for processing, and metaprogramming allows the exceptions to be further processed by the exchange. The exception could be a Web service call, or an error. The exchange can use the method_missing object to intercept the call and send it to the appropriate programming language environment.

As a dispatch mechanism for the JVM, an exchange according to various embodiments described herein can formalize the interaction among multiple programming languages hosted in the JVM. Programming languages supported by the JVM generally lack a straightforward pattern for exchanging data. Calls from one programming language to another can be set up on a per call basis, but the set up would be one-off, tedious, and would needlessly complicate multi-programming language development. The JVM was not intended to host multiple programming languages, and the programming languages it hosts are generally not designed with co-hosting in mind. However, various embodiments described herein can add structure to this system. It need not build on top of the existing interface by adding convention and hiding complexity.

Various embodiments described herein can provide a central internal exchange within the system. Client programming languages send requests through the internal exchange. The call within the exchange assures that the correct data types are used before forwarding the request, which may be routed again within the exchange, or to a destination programming language within the JVM. The calling programming language need not know what the destination programming language is, or it may be included as a parameter in the call.

In some embodiments, client programming language interaction may be similar to server gateway interfaces such as JSGI, WSGI, and Rack. These systems are designed for interaction between web servers and browsers. In contrast, various embodiments described herein may be designed for dispatch within a single JVM.

Figure 4:
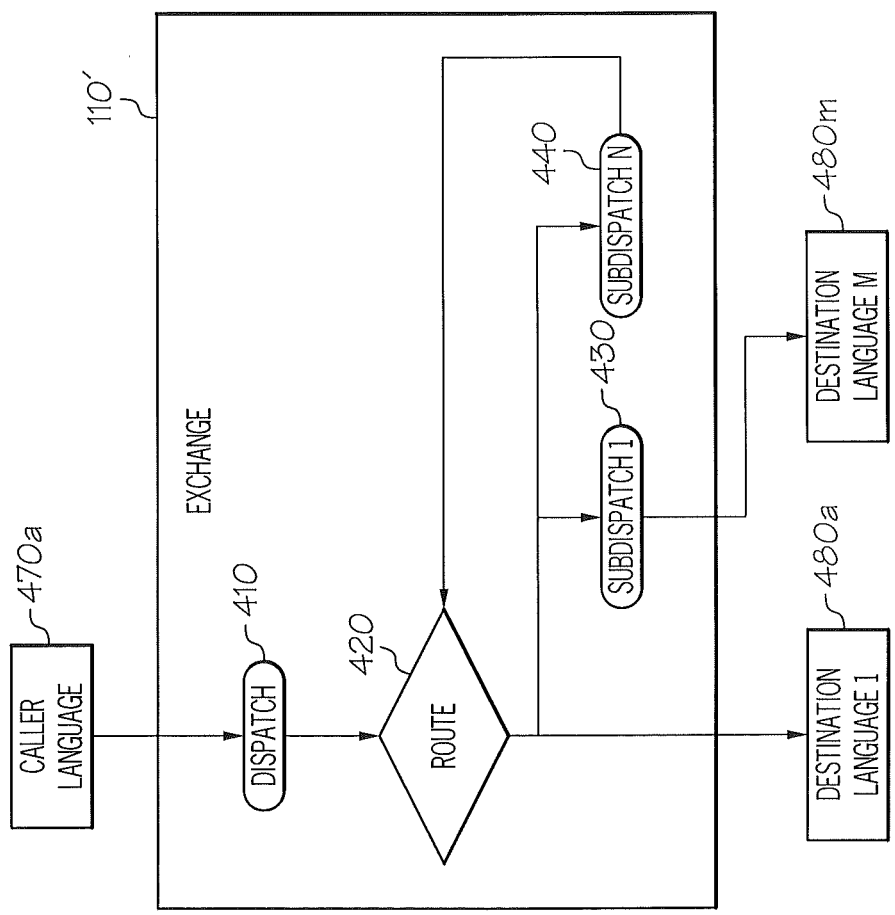
FIG. 4 is a flowchart of yet other operations that may be performed by an exchange of FIG. 1 according to various embodiments described herein.

Multiple instances of an exchange may be provided according to various embodiments described herein. For example, FIG. 4 is a flowchart of yet other operations that may be performed by an exchange of FIG. 1 according to various embodiments described herein. FIG. 4 describes operation of an exchange 110' from the standpoint of a caller programming language 470a and two or more destination programming languages 480a-480m, any of which may correspond to any of the compiler/interpreters 160 of FIG. 1.

As shown in FIG. 4, the exchange 110' intercepts a call from the Caller Programming language 470a, and a Dispatch function 410 may be used to identify a second program that runs on the JVM and is written in the second programming language to which the external call from the caller programming language may be directed. A routing function 420 directs the external call to the Destination Programming language 1 480a. SubDispatch systems 430 and 440 may also be used to route the caller programming language to other destination programming languages as appropriate. Moreover, if no routing is possible then the final SubDispatch System 440 may return an error message.

Thus, in FIG. 4, a JVM hosts many programming languages 470a, 480a and 480m. These programming languages are all compiled down to Java bytecode to run on the JVM, but they are not limited to the Java programming language itself. Programming languages such as Ruby, Python, Javascript, Scheme, and many others all have versions that can be hosted inside a JVM container. A second instance 430 of the exchange 110' may be provided to receive a call from the first instance 410 of the exchange 110'; identify a third program 480m that runs on the JVM and is written in a third of the plurality of programming languages, to which the external call from the first program may be directed; direct the external call to the third program 480m; receive a response to the external call from the third program; and forward the response to the external call that is received from the program, back to the first instance of the exchange.

Additional discussion of various embodiments of Block 310 of FIG. 3 will now be provided. In some embodiments, static mappings from programming languages may be used. Thus, when a programming language/environment is initialized in the JVM, it registers with the exchange. This registration may not be needed in other embodiments, as there are other ways to dynamically search through the JVM environments to find methods and classes, at the potential drawback of increased complexity.

The following is an example snippet of a registration:

```
(dispatch:route
  (rt:method "post")
  (rt:part "eval")
  (rt:body
    (lambda (env)
      (let ((output (with-output-to-string
        (eval
          (with-input-from-string
            (frankie:get-env env "detroit_input"))
          (current-environment)))))
        (puts "output in eval")
```
```
        (puts output)
        (puts "end output in eval")
        (list
          200
          (make-hash-table)
          output)))))
```

The above is scheme code that illustrates the environment lookup and the eval statement. The environment would contain the specifics of the programming language that was to be registered. The "eval" could provide the mapping of how that call maps to the inputs.

Additional discussion of Block 210 of FIGS. 2 and 3 will now be provided. Specifically, a caller programming language is attempting to make a call. In some embodiments, this external interface can be wrapped into an HTTP Interface. Thus, standard Web methods could be mapped. However, other interfaces may be used in other embodiments. In an HTTP Interface, requests may be formatted as: "/frankie/stats?ip=127.0.0.1&filename=/proc/meminfo" or "/frankie/eval" or "http://example.com:4444/frankie/asdf"; where "frankie" is the name given to the exchange 110.

Additional discussion of FIG. 4 will now be provided. Once a request was received and parsed, the dispatcher 410 would look up that specific path. In some embodiments, the paths were already registered, so it was already known what environment/programming language was mapped to that call. The dispatcher 410 would then match up the parameters and pass them on to the next call 430, 440 or destination programming language 480a. Note that the dispatcher 410, because it is another JVM internal, can be piggybacked onto itself to make more sub-calls in a hierarchical fashion, as was illustrated in FIG. 4. In other embodiments, the operations of FIG. 4 may be used to bridge among multiple JVMs.

The destination programming language 480a, 480m has its parameters and proceeds to make the appropriate call. The results would then be returned to the dispatcher for appropriate parsing and handing back to the original call 470a. In some embodiments, the return was mapped back to HTTP friendly returns (i.e. strings and status codes and/or other serialized representation) and then passed out of the JVM.

Thus, an exchange according to various embodiments described herein can be thought of as a router for the JVM. The router runs on the JVM and allows dynamic programming languages to communicate among themselves without the communications having to go through the Java stack down to the physical layer (Layer 1) of the Java stack. Rather, in some embodiments, communications may only need to go down to the transport layer (Layer 4) of the Java stack.

Figure 5:
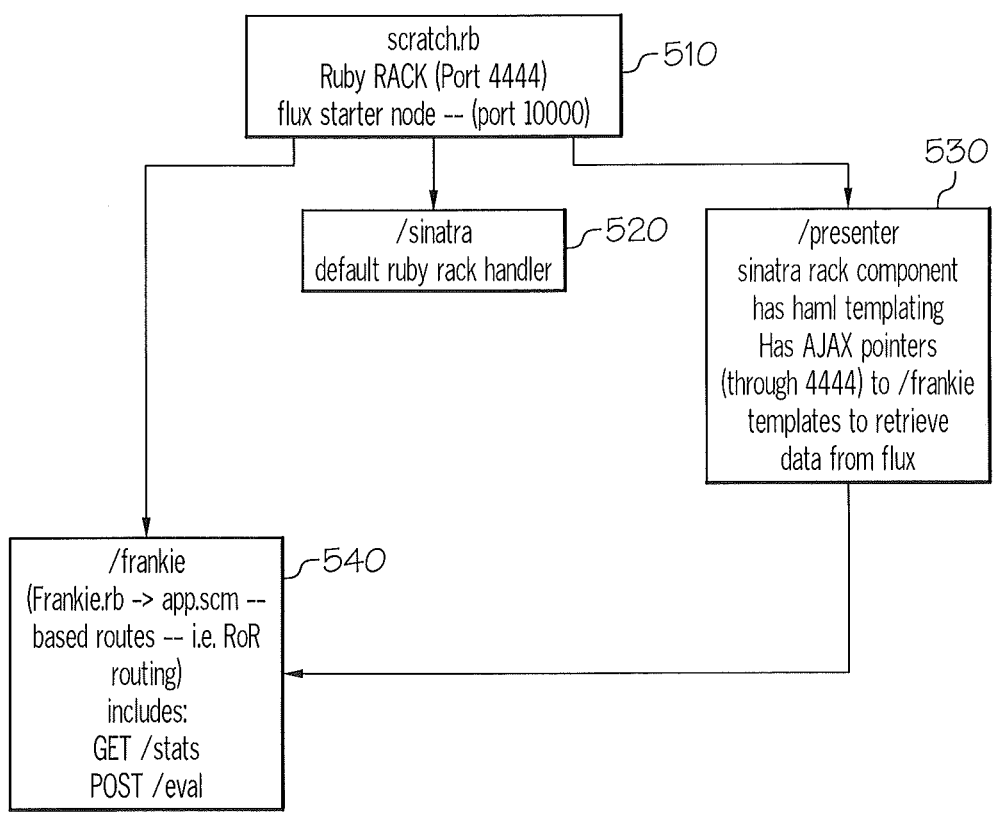
FIG. 5 is a block diagram of initialization of an exchange according to various embodiments described herein.

FIG. 5 is a block diagram of initialization of an exchange according to various embodiments described herein. As shown at Block 510, startup or bootstrap operations may be performed. Block 520 provides a Web-like interface to a first application ("sinatra") as a default handler and Block 530 presents a Web-like interface to another application ("presenter") as a default handler. The application at Block 530 can register with the exchange at Block 540.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

That which is claimed:

1. A computer program product comprising:
a non-transitory computer readable storage medium comprising computer readable program code embodied in the medium that when executed by at least one processor causes the at least one processor to perform operations for communicating among programs that run on a Java Virtual Machine (JVM) and that are written in a plurality of different programming languages that are hosted on the JVM, wherein the JVM comprises a first compiler/interpreter associated with a first programming language of the plurality of different programming languages that are hosted on the JVM, a first program that runs on the JVM and is written in the first programming language, a second compiler/interpreter associated with a second programming language of the plurality of different programming languages that are hosted on the JVM, and a second program that runs on the JVM and is written in the second programming language, wherein the operations run on the JVM, the operations comprising the following operations that are performed by an exchange module that is communicatively coupled to the first and second programs:

identifying methods that are used by the plurality of different programming languages that are hosted on the JVM, receiving, by the exchange module via the first compiler/interpreter, an exception comprising an external call from the first program, the exception indicating that a method associated with the external call cannot be processed by the first program;

in response to the receiving the exception, intercepting the external call from the first program;

determining that the external call may be directed to a method of the second program;

formatting the external call for processing by the method of the second program;

directing the external call to the second program;

receiving a response to the external call from the second program; and formatting the response for processing by the first program; and forwarding the response to the external call that is received from the second program, back to the first program.

2. A computer program product according to claim 1, wherein the receiving the exception comprising the external call from the first program the exception from the first program, the exception indicating that the method cannot be processed by the first program.

3. A computer program product according to claim 2, wherein the intercepting the exception from the first program comprises intercepting a JRuby "method missing" message from the first program.

4. A computer program product according to claim 1, wherein the identifying methods that are used by the plurality of different programming languages that are hosted on the JVM comprises:

maintaining a registry of methods executing on the JVM, wherein a plurality of methods from the first language are registered by the first compiler/interpreter and a plurality of methods from the second language are registered by the second compiler/interpreter.

5. A computer program product according to claim 1, wherein the exchange module is embodied by metaprogramming that runs on one of the plurality of different programming languages that are hosted on the JVM.

6. A computer program product according to claim 1, wherein the exchange module is a first exchange module and wherein the operations further comprise:

receiving, by a second exchange module that runs on the JVM, a call from the first exchange module comprising a second external call from the first program;

determining that the second external call may be directed to a third program that runs on the JVM and is written in a third of the plurality of programming languages that is hosted on the JVM by a third compiler/interpreter that runs on the JVM and is communicatively coupled to the second exchange module;

directing the second external call to the third program;

receiving a response to the second external call from the third program; and forwarding the response to the second external call that is received from the third program, back to the first program.

7. A computer system comprising an exchange module for communicating among programs that run on a Java Virtual Machine (JVM) and that are written in a plurality of different programming languages that are hosted on the JVM, wherein the JVM comprises a first compiler/interpreter associated with a first programming language of the plurality of different programming languages that are hosted on the JVM, a first program that runs on the JVM and is written in the first programming language, a second compiler/interpreter associated with a second programming language of the plurality of different programming languages that are hosted on the JVM, and a second program that runs on the JVM and is written in the second programming language, wherein the exchange module runs on the JVM, is communicatively coupled to the first and second programs, and causes the JVM to perform operations comprising:

identifying methods that are used by the plurality of different programming languages that are hosted on the JVM, receiving, via the first compiler/interpreter, an exception comprising an external call from the first program, the exception indicating that a method associated with the external call cannot be processed by the first program;

in response to the receiving the exception, intercepting the external call from the first program;

determining that the external call may be directed to a method of the second program;

formatting the external call for processing by the method of the second program;

directing the external call to the second program;

receiving a response to the external call from the second program; and formatting the response for processing by the first program; and forwarding the response to the external call that is received from the second program, back to the first program.

8. A system according to claim 7, wherein the receiving the exception comprising the external call from the first program comprises intercepting the exception from the first program, the exception indicating that the method cannot be processed by the first program.

9. A system according to claim 8, wherein the intercepting the exception from the first program comprises intercepting a JRuby "method missing" message from the first program.

10. A system according to claim 7, wherein the identifying methods that are used by the plurality of different programming languages that are hosted on the JVM comprises:

maintaining a registry of methods executing on the JVM, wherein a plurality of methods from the first language are registered by the first compiler/interpreter and a plurality of methods from the second language are registered by the second compiler/interpreter.

11. A system according to claim 7, wherein the exchange module is embodied by metaprogramming that runs on one of the plurality of different programming languages that are hosted on the JVM.

12. A system according to claim 7, wherein the exchange module is a first instance of the exchange module, the system further comprising a second instance of the exchange module that runs on the JVM that causes the JVM to perform operations comprising:

receiving a call from the first instance of the exchange module comprising a second external call from the first program;

determining that the second external call may be directed to a third program that runs on the JVM and is written in a third of the plurality of programming languages that is hosted on the JVM by a third compiler/interpreter that runs on the JVM am dos communicatively coupled to the second instance of the exchange module;

directing the second external call to the third program;
receiving a response to the second external call from the third program; and
forwarding the response to the second external call that is received from the third program, back to the first instance of the exchange module.

13. A system according to claim 7, in combination with the JVM, the first compiler/interpreter associated with the first programming language of the plurality of different programming languages that are hosted on the JVM, and the second compiler/interpreter associated with the second programming language of the plurality of different programming languages that are hosted on the JVM.

14. A process for communicating among programs that run on a Java Virtual Machine (JVM) and that are written in a plurality of different programming languages that are hosted on the JVM, wherein the JVM comprises a first compiler/interpreter associated with a first programming language of the plurality of different programming languages that are hosted on the JVM, a first program that runs on the JVM and is written in the first programming language, a second compiler/interpreter associated with a second programming language of the plurality of different programming languages that are hosted on the JVM, and a second program that runs on the JVM and is written in the second programming language, the process comprising the following operations that are performed on the JVM by an exchange module that is communicatively coupled to the first and second programs:
 identifying methods that are used by the plurality of different programming languages that are hosted on the JVM,
 receiving, by the exchange module via the first compiler/interpreter, an exception comprising an external call from the first program, the exception indicating that a method associated with the external call cannot be processed by the first program;
 in response to the receiving the exception, intercepting the external call from the first program;
 determining that the external call may be directed to a method of the second program;
 formatting the external call for processing by the method of the second program;
 directing the external call to the second program;
 receiving a response to the external call from the second program;
 formatting the external call for processing by a method of the second program;
 forwarding the response to the external call that is received from the second program, back to the first program.

15. A process according to claim 14, wherein the receiving the exception from the first program comprises intercepting a JRuby "method missing" message from the first program.

* * * * *